United States Patent
Calo et al.

(10) Patent No.: US 9,858,404 B2
(45) Date of Patent: *Jan. 2, 2018

(54) CONTROLLING PRIVACY IN A FACE RECOGNITION APPLICATION

(71) Applicant: International Business Machines Corporation, Armonk, NY (US)

(72) Inventors: Seraphin B. Calo, Cortlandt Manor, NY (US); Bong Jun Ko, Harrington Park, NJ (US); Kang-Won Lee, Seoul (KR); Theodoros Salonidis, Boston, MA (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/403,201

(22) Filed: Jan. 11, 2017

(65) Prior Publication Data

US 2017/0169205 A1    Jun. 15, 2017

Related U.S. Application Data

(63) Continuation of application No. 14/968,972, filed on Dec. 15, 2015.

(51) Int. Cl.
*G06F 21/32* (2013.01)
*G06F 17/30* (2006.01)

(52) U.S. Cl.
CPC ........ *G06F 21/32* (2013.01); *G06F 17/30259* (2013.01)

(58) Field of Classification Search
CPC .......................... G06F 21/32; G06F 17/30259
See application file for complete search history.

(56) References Cited

U.S. PATENT DOCUMENTS

| 7,187,787 B2 | 3/2007 | Milne et al. |
| 8,108,398 B2 | 1/2012 | Guday et al. |
| 8,301,902 B2 | 10/2012 | Griffin |

(Continued)

OTHER PUBLICATIONS

Cammozzo, "Face Recognition and Privacy Enhancing Techniques." The Social Impact of Social Computing, 2011, 11 pages.

(Continued)

*Primary Examiner* — Darren B Schwartz
(74) *Attorney, Agent, or Firm* — Reza Sarbakhsh

(57) ABSTRACT

Embodiments of the present invention may involve a method, system, and computer program product for controlling privacy in a face recognition application. A computer may receive an input including a face recognition query and a digital image of a face. The computer may identify a target user associated with a facial signature in a first database based at least in part on a statistical correlation between a detected facial signature and one or more facial signatures in the first database. The computer may extract a profile of the target user from a second database. The profile of the target user may include one or more privacy preferences. The computer may generate a customized profile of the target user. The customized profile may omit one or more elements of the profile of the target user based on the one or more privacy preferences and/or a current context.

1 Claim, 7 Drawing Sheets

(56) References Cited

U.S. PATENT DOCUMENTS

| | | | |
|---|---|---|---|
| 8,457,367 B1* | 6/2013 | Sipe | G06K 9/00221 382/118 |
| 8,676,810 B2 | 3/2014 | Moraleda et al. | |
| 8,768,975 B2 | 7/2014 | Boyd et al. | |
| 9,152,849 B2 | 10/2015 | Ganong et al. | |
| 9,208,326 B1* | 12/2015 | Gates | G06F 21/60 |
| 9,607,138 B1* | 3/2017 | Baldwin | G06F 21/32 |
| 2003/0123713 A1* | 7/2003 | Geng | G06K 9/00288 382/118 |
| 2003/0215115 A1* | 11/2003 | Kim | G06K 9/00281 382/118 |
| 2004/0052418 A1 | 3/2004 | DeLean | |
| 2007/0140532 A1* | 6/2007 | Goffin | G06K 9/00288 382/118 |
| 2008/0267459 A1* | 10/2008 | Nakada | G09B 21/009 382/118 |
| 2008/0288355 A1 | 11/2008 | Rosen | |
| 2009/0086048 A1* | 4/2009 | Jiang | G06T 13/40 348/222.1 |
| 2009/0141948 A1* | 6/2009 | Nakaoka | G06F 21/32 382/118 |
| 2009/0285456 A1* | 11/2009 | Moon | G06K 9/00315 382/118 |
| 2010/0179874 A1* | 7/2010 | Higgins | G06K 9/00664 705/14.53 |
| 2010/0329568 A1* | 12/2010 | Gamliel | G06K 9/00241 382/190 |
| 2011/0135166 A1* | 6/2011 | Wechsler | G06K 9/00288 382/118 |
| 2011/0202968 A1 | 8/2011 | Nurmi | |
| 2012/0162443 A1* | 6/2012 | Allen | G06F 3/012 348/207.1 |
| 2012/0169465 A1* | 7/2012 | Chang | B60W 50/00 340/5.83 |
| 2012/0250950 A1 | 10/2012 | Papakipos et al. | |
| 2012/0284332 A1 | 11/2012 | Pradeep et al. | |
| 2013/0005443 A1* | 1/2013 | Kosta | G07F 17/3206 463/25 |
| 2013/0035979 A1 | 2/2013 | Tenbrock | |
| 2013/0267204 A1* | 10/2013 | Schultz | H04W 12/06 455/411 |
| 2013/0305383 A1 | 11/2013 | Garralda et al. | |
| 2013/0347057 A1 | 12/2013 | Hurwitz et al. | |
| 2014/0153900 A1* | 6/2014 | Tanaka | G11B 27/034 386/239 |
| 2014/0283125 A1 | 9/2014 | Stanley et al. | |
| 2014/0294257 A1 | 10/2014 | Tussy | |
| 2015/0016687 A1 | 1/2015 | Wang et al. | |
| 2016/0307028 A1* | 10/2016 | Fedorov | G06T 7/20 |
| 2016/0381013 A1 | 12/2016 | Buscemi | |

OTHER PUBLICATIONS

Welinder, "Facing Real-Time Identification in Mobile Apps & Wearable Computers." Santa Clara High Tech. LJ 89 (2014), vol. 30, Issue 1, Article 4, 51 pages.

Jana et al., "Enabling Fine-Grained Permissions for Augmented Reality Applications With Recognizers", Proceedings of the 22nd USENIX Security Symposium, Aug. 14-16, 2013, Washington, D.C., 17 pages.

Jana et al., "A Scanner Darkly: Protecting User Privacy From Perceptual Applications", 2013 IEEE Symposium on Security and Privacy, pp. 349-363.

Erkin et al., "Privacy-Preserving Face Recognition", PETS 2009, LNCS5672, 2009, pp. 235-253.

Newton et al., "Preserving Privacy by De-identifying Facial Images", IEEE Transactions on Knowledge and Data Engineering, vol. 17, No. 2, pp. 232-243.

Mogg, "Anti-Glass Specs Developed to Block Face Recognition Technology", www.digitaltrends.com/cool-tech/anti-glass-specs-developed-to-block-face-recognition-technology/, Jun. 24, 2013, 5 pages.

http://www.skybiometry.com/, "Sky Biometry", printed Nov. 14, 2015, 1 page.

https://rekognition.com/, "Orbeus ReKognition API", Integrated Visual Recognition Solution Based in the Cloud, printed on Nov. 20, 2015, 2 pages.

http://www.cognitec.com, "The Face Recognition Company"—Cognitec, printed on Nov. 20, 2015, 5 pages.

http://www.npr.org/blogs/alltechconsidered/2013/07/17/202725167/clever-hacks-give-google-glass-many-unintended-powers, "Clever Hacks Give Google Glass Many Unintended Powers" printed Nov. 20, 2015, 4 pages.

Mell et al., "The NIST Definition of Cloud Computing", National Institute of Standards and Technology, Special Publication 800-145, Sep. 2011, pp. 1-7.

Calo et al., Pending U.S. Appl. No. 14/968,972, filed Dec. 15, 2015, titled "Controlling Privacy in a Face Recognition Application,", pp. 1-42.

Calo et al., Pending U.S. Appl. No. 15/063,116, filed Mar. 7, 2016, titled "Controlling Privacy in a Face Recognition Application,", pp. 1-37.

IBM: List of IBM Patents or Patent Applications Treated As Related (Appendix P), Jan. 11, 2017, pp. 1-2.

Calo et al., Pending U.S. Appl. No. 15/403,202, filed Jan. 11, 2017, titled "Controlling Privacy in a Face Recognition Application,", pp. 1-38.

\* cited by examiner

US 9,858,404 B2

CONTROLLING PRIVACY IN A FACE RECOGNITION APPLICATION

BACKGROUND

The present invention relates generally to the field of computing, and more particularly to controlling privacy in a face recognition application.

Face recognition technologies may be used on mobile phones and wearable devices and may invade user privacy. A "sensor" mobile user may be able to identify a "target" mobile users without his or her consent. Existing mobile device manufacturers may not provide privacy mechanisms for addressing this problem. Existing cloud-based face recognition services and companies may not provide face recognition privacy guarantees to the end users.

SUMMARY

Embodiments of the present invention disclose a method for controlling privacy in a face recognition application. The method may include receiving an input including a face recognition query and a digital image of a face. The method may include identifying a target user associated with a facial signature in a first database based at least in part on a statistical correlation between a detected facial signature and one or more facial signatures in the first database. The method may include extracting a profile of the target user from a second database. The profile of the target user may include one or more privacy preferences. The method may include generating a customized profile of the target user. The customized profile may omit one or more elements of the profile of the target user based on the one or more privacy preferences.

Embodiments of the present invention disclose a computer program product for controlling privacy in a face recognition application. The computer program product may include a computer readable storage medium having program instructions embodied therewith. The computer readable storage medium is not a transitory signal per se. The program instructions may be executable by a computer to cause the computer to perform a method. The method may include receiving an input including a face recognition query and a digital image of a face. The method may include identifying a target user associated with a facial signature in a first database based at least in part on a statistical correlation between a detected facial signature and one or more facial signatures in the first database. The method may include extracting a profile of the target user from a second database. The profile of the target user may include one or more privacy preferences. The method may include generating a customized profile of the target user. The customized profile may omit one or more elements of the profile of the target user based on the one or more privacy preferences.

Embodiments of the present invention disclose a system for controlling privacy in a face recognition application. The system may include one or more computer processors, one or more computer-readable storage media, and program instructions stored on the computer-readable storage media for execution by at least one of the one or more processors. The program instructions may include instructions to receive, by the computer, an input including a face recognition query and a digital image of a face. The program instructions may include instructions to identify, by the computer, a target user associated with a facial signature in a first database based at least in part on a statistical correlation between a detected facial signature and one or more facial signatures in the first database. The program instructions may include instructions to extract, by the computer, a profile of the target user from a second database. The profile may include one or more privacy preferences. The program instructions may include instructions to generate, by the computer, a customized profile of the target user, wherein the customized profile omits one or more elements of the profile of the target user based on the one or more privacy preferences.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may present a method, system, and apparatus for controlling user privacy in a face recognition application. Face recognition technologies may be increasingly used on mobile phones and wearable devices and may enable a user to invade another user's privacy. For example, a sensor user may be able to identify a target user without his or her consent. Existing mobile device manufacturers may not provide any privacy mechanisms for addressing this problem. For example, a company may ban face recognition functions of wearable glasses, but may not guarantee that this will be long-lived commitment, and the ban may be circumvented by software developers. Similarly, existing cloud-based face recognition services or companies may not provide face recognition privacy guarantees to end users. Some existing privacy protection methods may address a different privacy problem involving face recognition protection from malicious applications or untrusted servers that perform a face recognition computation. However, they may not protect against a trusted user performing a face recognition request. Conventional face recognition privacy opt out proposals may involve requiring a target user to wear special apparel that may alter an image captured by a camera. However, this technique requires the target user to wear the special apparel in order to maintain privacy. In addition to the limitations of existing privacy opt-out approaches, an additional problem may occur if a target user wants to reveal information about themselves in certain situations. Providing context-dependent privacy control for target users (as opposed to just opting out) may enable provide a target user with greater flexibility while protecting the target user's privacy.

Embodiments of the present invention may include a method and system for privacy control in face recognition applications. Embodiments include a face recognition system, where users (hereinafter "sensor users") may use a camera to discover information about other people (hereinafter "target users") using a face recognition service deployed in the cloud. The face recognition service may have access to a face database, a privacy database, and a profile database. The face database may contain one or more facial signatures of one or more users. The profile database may contain information about the target user, such as, for example, a name, gender, age, and location. The privacy database may contain privacy preferences of target users. Privacy preferences may be provided by a target user or an operator of a face recognition service and stored in the privacy database. A target user's profile information may be extracted from the profile database. A customized profile may be generated based on the privacy preferences of the target user. The customized profile may be provided to the sensor user. Embodiments of the present invention will now be described in detail with reference to FIGS. 1-6.

Figure 1:
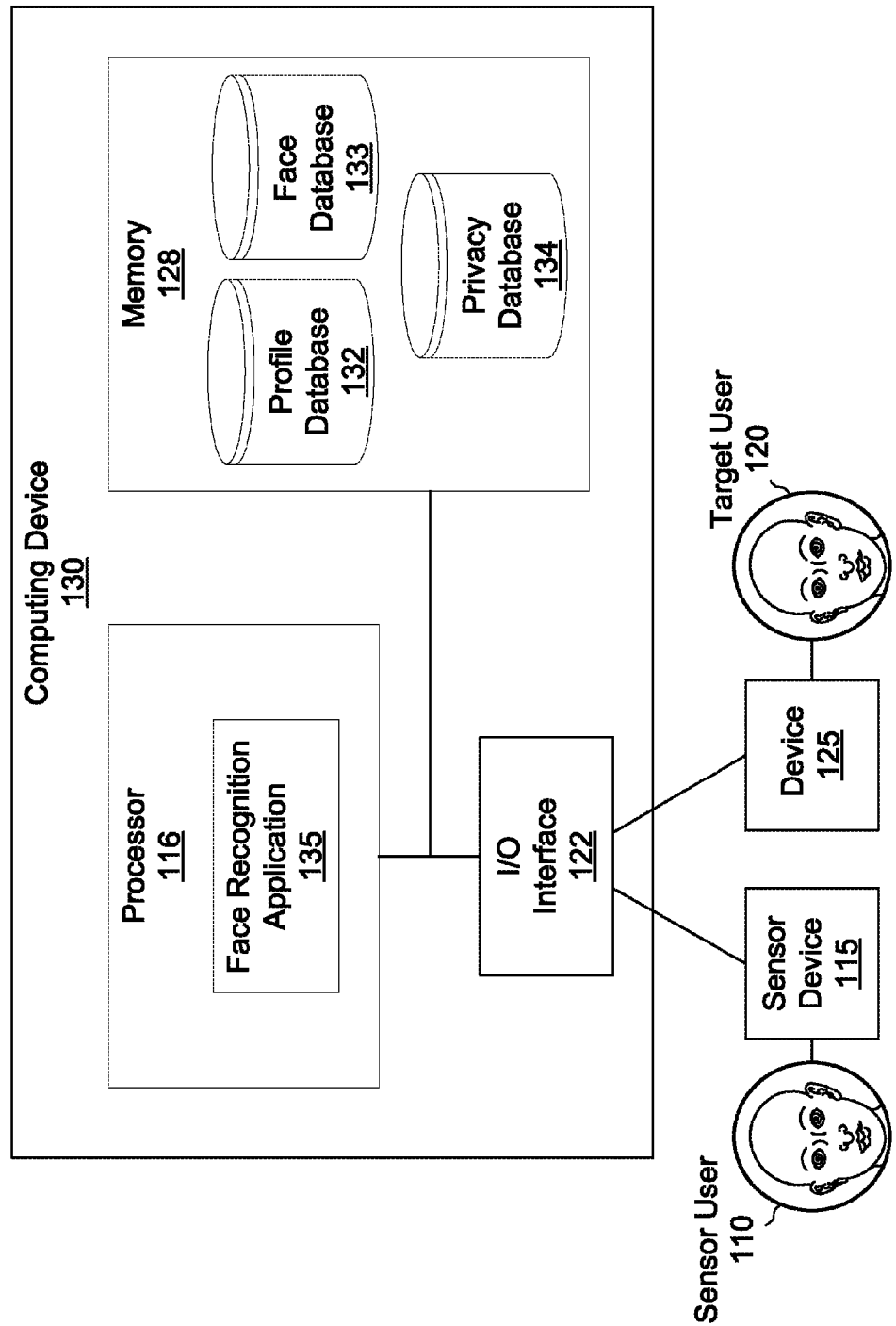
FIG. 1 depicts a privacy control system, in accordance with an embodiment of the present invention.

FIG. 1 is a privacy control system 100, according to an aspect of the invention. In an exemplary embodiment, the privacy control system 100 may include a computing device 130, a sensor device 115, and a device 125. The computing device 130 may include, for example, a processor 116, memory 128, and an input/output (I/O) interface 122. A face recognition application 135 may be a program, function, or module of a computer program (not shown) executable by the processor 116.

Figure 5:
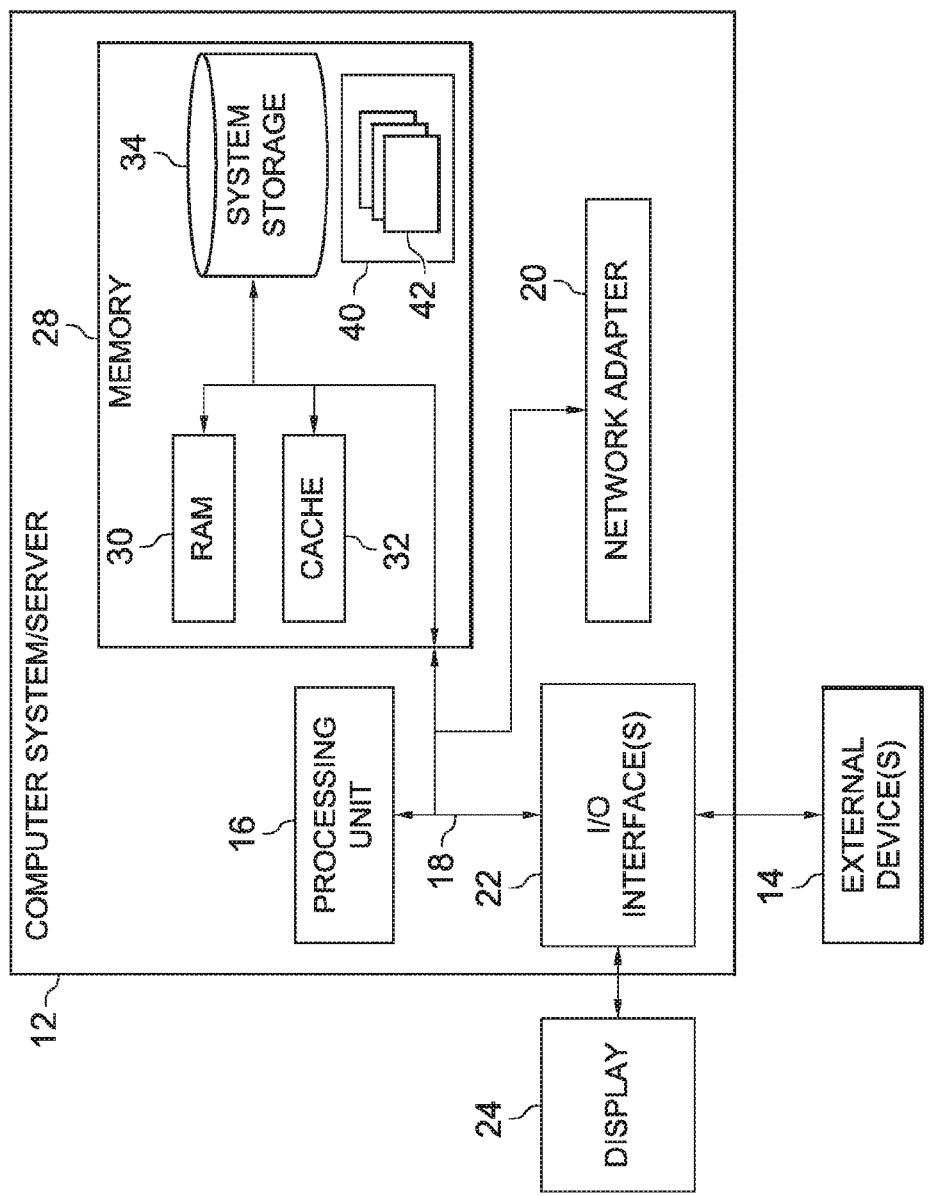
FIG. 5 depicts a block diagram of components of the proxy server computer executing the privacy control program, in accordance with an embodiment of the present invention.

Privacy control system 100 may be implemented using a computing node such as the cloud computing node of FIG. 5. It is not necessary that the computing node described in FIG. 5 be a cloud computing node and may be, instead, implemented using a general purpose computer.

Sensor device 115 may be a laptop computer, tablet computer, netbook computer, personal computer (PC), desktop computer, smart phone, or any programmable electronic device. Sensor device 115 may include internal and external hardware components. Sensor device 115 may include any communication device known in the art, such as, for example, a Bluetooth device, WiFi device, near-field communication (NFC) device, radio frequency device, or any combination thereof. Sensor device 115 may include an image capturing device, such as, for example, a digital camera. Sensor device 115 may be operated by one or more users, such as, for example, a sensor user 110.

Device 125 may be a laptop computer, tablet computer, netbook computer, personal computer (PC), desktop computer, smart phone, or any programmable electronic device. Device 125 may include internal and external hardware components. Device 125 may include any communication device known in the art, such as, for example, a Bluetooth device, WiFi device, near-field communication (NFC) device, radio frequency device, or any combination thereof. Sensor device 115 may include an image capturing device, such as, for example, a digital camera. Device 125 may be operated by one or more users, such as, for example, a target user 120.

A network (not shown) may connect the sensor device 115 and/or the device 115 to the computing device 130. The network may be any combination of connections and protocols that will support communications between the devices. In an embodiment, the network may be the Internet, representing a worldwide collection of networks and gateways to support communications between devices connected to the Internet. The network may include, for example, wired, wireless or fiber optic connections. In other embodiments, the network may be implemented as an intranet, a local area network (LAN), a wide area network (WAN), a cellular network, or a combination thereof. Network 110 may include wired connections, wireless connections, fiber optic connections, or a combination thereof.

In an embodiment, there may be at least two types of input actions in the system, including privacy preferences and face recognition queries. In a first type of action, the system may receive as an input privacy preferences which control whether, when, where, how and what profiles about the target user will be shared with the sensor users. Privacy preferences may be submitted by either target users or by an operator of a face recognition service.

A target user may submit one or more privacy preferences to identify which profile, if any, may be returned to a sensor user for a given context. The submission of privacy preferences to the system may update the privacy database. Such updates may be either static or dynamic. In static updates, the target user may define in advance a context and a corresponding profile and upload each to the privacy database. In a dynamic update, the target user may change context and create a profile and enable sharing of the profile. As the target user changes contexts (e.g. geographic location, time, situation, mood, etc), the contexts and profile may be stored as an entry in the privacy database. The entry may be used again when a same context (e.g. geographic location, time, situation, mood, etc) occurs again (e.g., when the target user is sensed by the sensor user at that context).

An operator of a face recognition service may submit one or more privacy preferences to impose contextual restrictions on where a sensor user may or not to use the face recognition service. For example, the privacy preferences may be set to not allow usage of face recognition at sensitive locations, times, or occasions. The operator of the face recognition service may set privacy preferences either statically in advance or dynamically during the system operation.

In one embodiment, the privacy preferences in the database may be implemented as database records that contain information pertaining to a context and a profile that should be used in that context. The context information may consist of (but is not limited to) location, time, objective, situation, face context, etc. A face context may include, for example, a smile, frown, gender, and age. The profile information may consist of multiple items each item type being (but is not limited to) text, video, image or audio. The items may belong to one or more contexts and a set of items synthesizes a profile that corresponds to a specific context.

In an embodiment, the privacy database may contain contextual restrictions which allow (or prevent) sensor users to use the face recognition service. For example, the system may not allow usage of face recognition at specific locations or at specific times or at specific occasions. Such restrictions may be determined by the operator of the face recognition service.

In a second type of input, a sensor user may submit a face recognition query along with, for example, a current context and an image and/or video to the face recognition system, to identify target users in a vicinity. More specifically, the following steps are followed:

The sensor user may submit a face recognition query. The face recognition query may signal an intention of the sensor user to recognize faces in her vicinity. In addition, it may also define context and/or profile data of interest to the sensor user. For example, the sensor user may be interested in profiles within a certain context (e.g. geographic region) or profile attributes that describe certain interests.

In an embodiment, the face recognition system may check a privacy database for one or more privacy preferences set by an operator. If a sensor user submits a face recognition query with contextual restrictions in conflict with one or more privacy preferences, the face recognition query may be blocked.

In another embodiment, a sensor user may submit a video stream to a face detection application. The face detection application may detect one or more faces in the video stream and output a set of face signatures corresponding to the one or more faces in the video stream.

The face signatures may be input to a face recognition application. The face recognition application may match the face signatures with face signatures stored in the face database. If no match is found, the face recognition query terminates and no profile info is returned to the sensor user. Otherwise, the system proceeds as follows.

The face recognition application may output matched target user identities and their current face context. The current face context may contain features that express the current state of the target user derived from facial characteristics, which may include but not limited to smile, frown, gender, color, emotional state (e.g. mood), etc. With an identity and a current face context of each target user, the system may extract a profile, as follows:

The system may check with the privacy database if the target user that matches the identity wishes to share profile information. If the target user's privacy settings are set not to share, the face recognition query terminates and no profile info is returned to the sensor user. Otherwise the system may proceed as follows.

The system may determine the current context of the target user (e.g. current location, time, situation, objective, current face context, or a combination thereof). In an embodiment, if the location of the target user is not available, the system may use as an approximation the location of the sensor user when determining the current context of the target user.

The current context may be matched with the closest context of this target user stored in the privacy database. If the closest context matches the current context within a specified accuracy threshold, the system may retrieve a default profile that has been pre-defined by the target user. Otherwise, the system may proceeds as follows:

The system may retrieve the profile of the closest context stored in the privacy database. In an embodiment, the system may augment the closest context in the privacy database by adding to it the current face context that was output by the face recognition application.

The retrieved profile and its context may be matched to the context and profile preferences in the face recognition query of the sensor user. If there is no match, the face recognition query may terminate and may not provide a profile to the sensor user. Otherwise the system may proceeds as follows:

In an embodiment, the target user's profile may be transmitted to the sensor user. One or more elements of the target user's profile may be omitted based on the privacy preferences.

The system may generate a summary of the outcome of the face recognition query. This summary may contains the success or failure of the query, the extracted profile F, the current context C and its closest context in the privacy database, and the identity of the sensor user. In an embodiment, the summary of the outcome of the face recognition query may be stored in the privacy database for later access by the target user.

In another embodiment, the system may provide a notification to the target users. A first type of notification may include providing the target user with a summary of the face recognition query if a face recognition query occurs. A second type of notification the system may continuously track the context changes of the target user (e.g. by matching the contexts with the existing contexts in the database) and, upon each change, notify the target user about the new profile that will be shared through the face recognition service.

Figure 2:
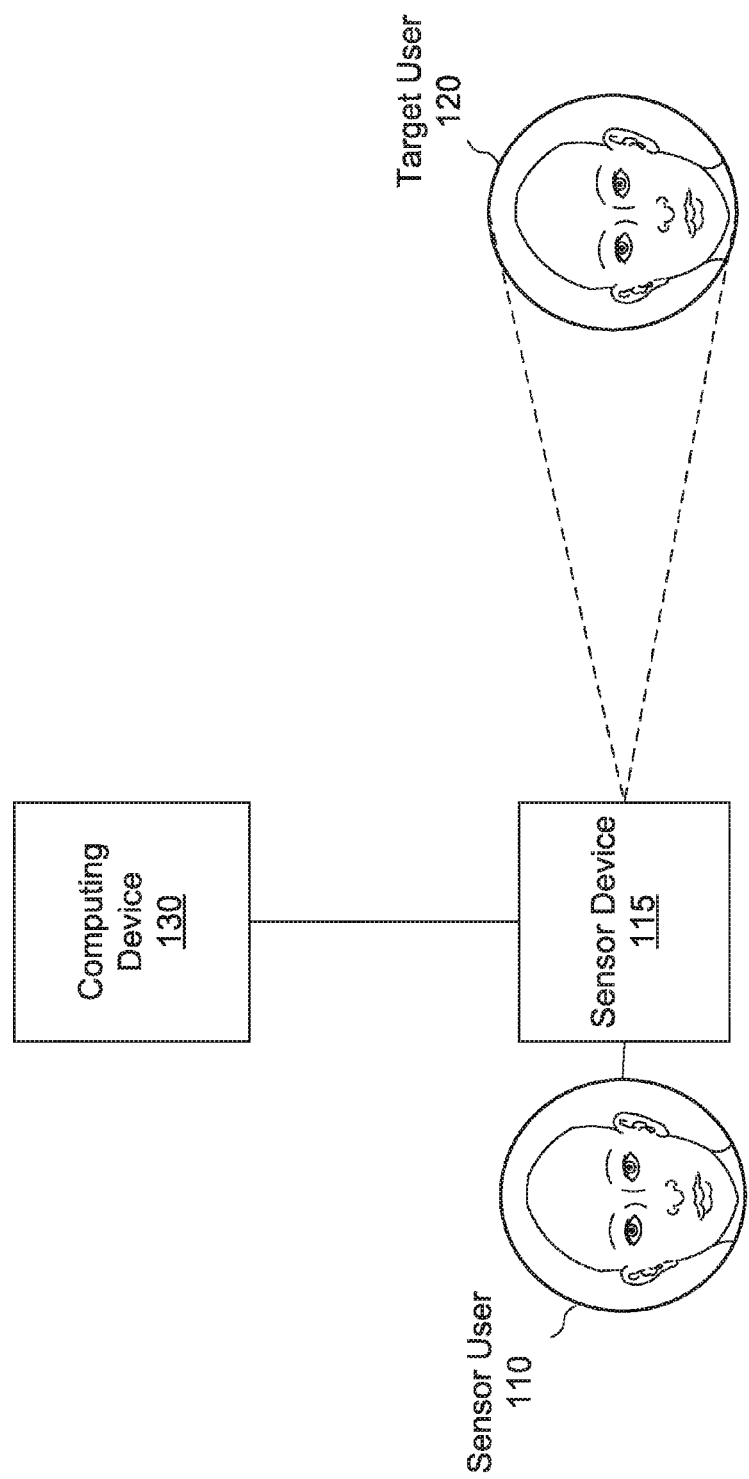
FIG. 2 depicts face recognition environment, in accordance with an embodiment of the present invention.

Referring now to FIG. 2, a face recognition environment 200 is shown, in accordance with an embodiment of the present invention. The face recognition environment may include the sensor device 115 and the target user 120. In an embodiment, the sensor device 115 may be operated by the sensor user 110. The sensor device 115 may capture an image of the target user. The captured image may include, for example, an image of the face of the target user 120. The captured image may be a digital image. In an embodiment, the captured image may be transmitted to the computing device 130.

Figure 3B:
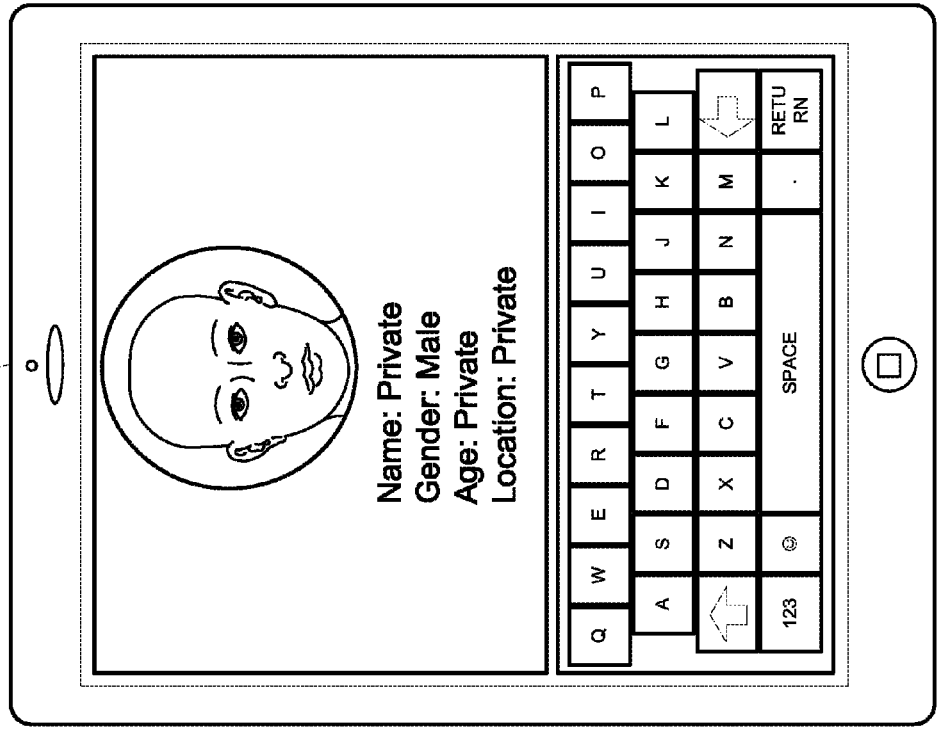
FIGS. 3A-3B depict a privacy control environment, in accordance with an embodiment of the present invention.
Figure 3A:
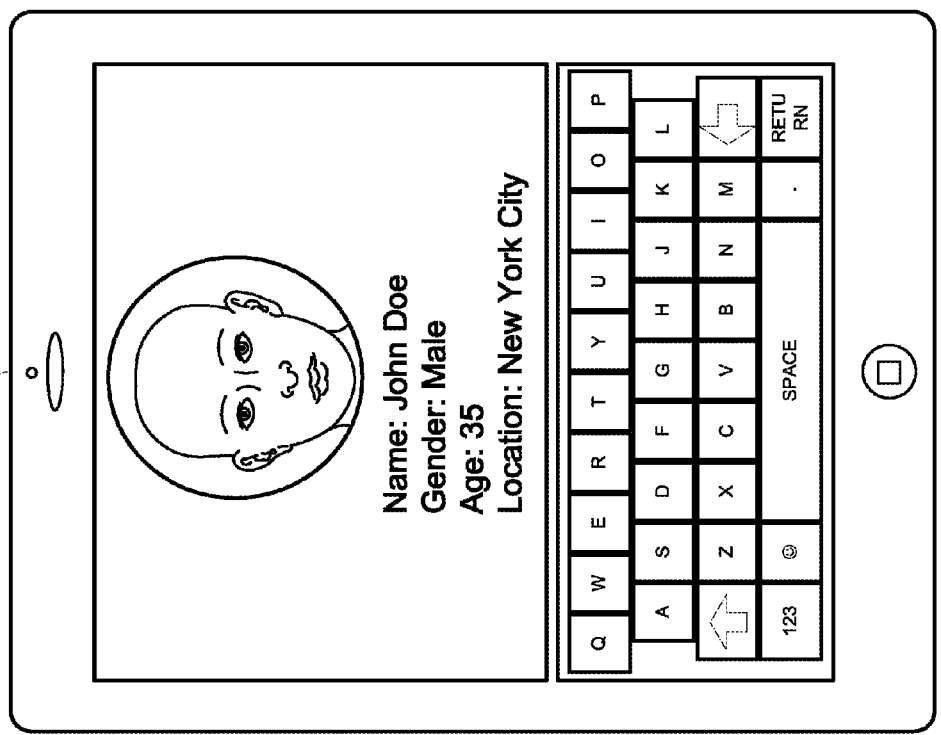

Referring now to FIGS. 3A-3B, examples of a sensor device are shown, in accordance with an embodiment of the present invention. In an embodiment, the sensor device 115 (e.g. a sensor device 315) may receive a profile and/or a customized profile of the target user.

In an embodiment, the sensor device 315 may receive a profile of the target user. The profile may include one or more elements, such as, for example, an image of the target user, a name of the target user, a gender of the target user, an age of the target user, a location of the target user, or any combination thereof. For example, the name of the target user may be indicated by providing "Name: John Doe". The sensor device 315 may receive the profile from a computing device (e.g. the computing device 130).

In an embodiment, the sensor device 315 may receive a customized profile of the target user. The customized profile may include one or more elements, such as, for example, an image of the target user, a name of the target user, a gender of the target user, an age of the target user, a location of the target user, or any combination thereof. In an embodiment, one or more elements may of the customized profile may be provided based on a context (e.g., a location of the target user). For example, when a user is at a location, a particular aspect of her profile may be revealed or an element of her profile may contain different information. For example, if a person is at a business conference, her profile may contain elements that are specific to that conference. In another example, if a person is at a sporting event, her profile may contain elements related to her experience with the sport. In an example, a "nickname" field of the person may change depending on the context (e.g., a location of the target user). In an embodiment, at least one element of the customized profile may be censored. For example, a name of the target user, an age of the target user, and a location of the target user may be censored. In an embodiment, a censored element may be hidden or an indication may be given that the censored element is censored. For example, a name may simply not be included in the customized profile. In another example, a censored name may be provided as "Name: Private" if a name element is censored. In an embodiment, uncensored elements may be included in the customized profile and censored elements may not be included. For example, if a gender is uncensored and a name is censored the customized profile may include "Gender: Male" and "Name: Private". In an embodiment, all of the elements of the customized profile may be censored. For example, if all the elements of the customized profile are censored, an error message may be provided (e.g. "This Profile is Private", "No results found", etc.) or censored elements may be provided in a censored form (e.g. "Name: Private"). The sensor device 315 may receive the profile from a computing device (e.g. the computing device 130).

Figure 4:
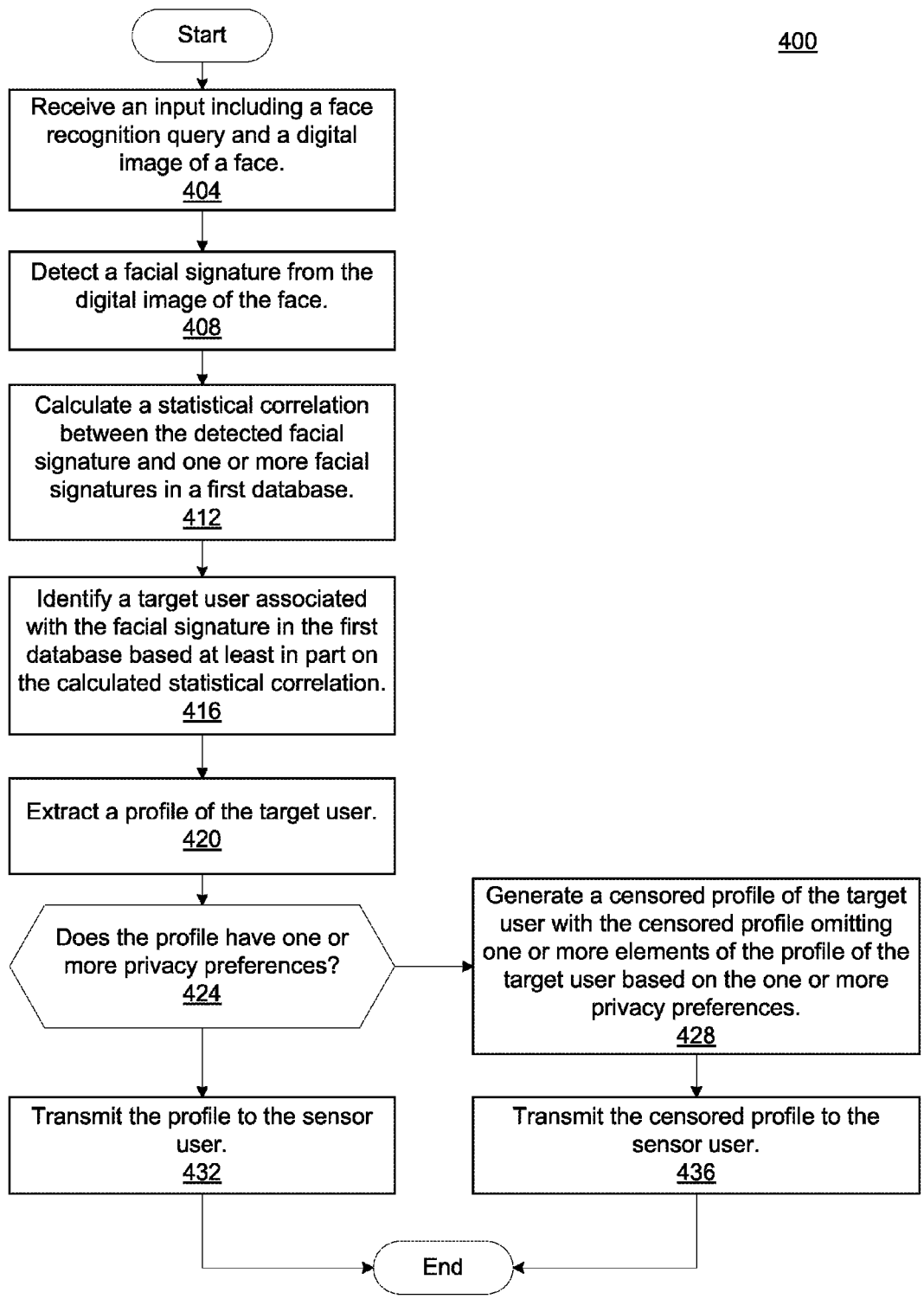
FIG. 4 is a flowchart depicting steps of a privacy control application, in accordance with an embodiment of the present invention.

FIG. 4 is a flowchart of a method 400 for controlling privacy in a face recognition application, using the privacy control system 100 of FIG. 1, in accordance with an embodiment of the present invention. Steps of method 400 may be executed using a processor of a computer that encompasses, or is part of, privacy control system 100, or another system. In an embodiment, a method of 400 may involve receiving an input including a face recognition query and a digital image of a face (step 404), detecting a facial signature from the digital image of the face (step 408), calculating a statistical correlation between the detected facial signature and one or more facial signatures in a first database (step 412), identifying a target user associated with the facial signature in the first database based at least in part on the calculated statistical correlation (step 416), extracting a profile of the target user from a second database (420), determining whether the profile of the target user includes one or more privacy preferences (decision 424), generating a customized profile of the target user with the customized profile omitting one or more elements of the profile of the target user based on the one or more privacy preferences (step 428), transmitting the profile of the target user to a sensor user (step 432), and transmitting the customized profile of the target user to a sensor user (step 436).

Step 404 may involve receiving an input including a face recognition query and a digital image of a face. In an embodiment, the input may be received from the sensor user. For example, a sensor user may submit a face recognition query along with, for example, a current context and an image (e.g. a digital photograph, series of digital photographs, and/or digital video) to the face recognition system, requesting to identify a target user depicted in the image.

The face recognition query may signal an intention of the sensor user to recognize one or more faces in the image. In addition, the face recognition query may also define a context and/or profile data of interest to the sensor user. For example, the sensor user may be interested in profiles within a certain context (e.g. geographic region) or profile attributes that describe certain interests. Metadata associated with the image may indicate a context of the image (e.g. a location the image was captured). In an embodiment, the metadata associated with the image may be used in one or more of the following steps. For example, the metadata associated with the image may be used in step 424 to determine whether privacy preferences associated with a triggering event (e.g. a location a digital image is captured) exist.

Step 408 may involve detecting a facial signature from the digital image of the face. In an embodiment, an image of a face of a target user may be analyzed a face detection application. The face detection application may detect one or more faces in the video stream and output a set of facial signatures corresponding to the one or more faces in the image. In an embodiment, the face application may generate a facial signature by sampling various points of the image of the face, aggregating the information associated with the sampling, and hash the sampled points into a face attribute value associated with each sampled point.

Step 412 may involve calculating a statistical correlation between the detected facial signature and one or more facial signatures in a first database. The facial signatures may be input into the face recognition application. The face recognition application may calculate a statistical correlation between a facial signature from the image and one or more face signatures stored in the face database. For example, a correlation probability matrix may provide a likelihood of a match between the facial signature from the image and one or more facial signatures in a face database. In an example, various face attribute values associated with various sampled points of the face in the image may be compared to corresponding face attribute values of one or more facial signatures in the face database. If no correlation is found, the face recognition query may terminate and no profile may be generated. If a correlation between the face signature in the image and one of the face signatures stored in the face database, the correlation may be used to identify the target user, as described in step 416.

Step 416 may involve identifying a target user associated with the facial signature in the first database based at least in part on the calculated statistical correlation. Identifying the target user associated with the facial signature in the first database may involve determining which user associated with a facial signature in the face database has a highest probability of corresponding the face of the captured image. In an embodiment, identifying a target user may be based on the calculated statistical correlation, metadata associated with the image of the face (e.g. a location the picture is captured), a determined location of the target user, one or more second facial signatures generated from the image, or any combination thereof. In a preferred embodiment, identifying the target user may be based at least in part on the calculated correlation.

Step 420 may involve extracting a profile of the target user from a second database. In an embodiment, the profile may include one or more elements (e.g. an image, name, gender, location, etc.). The one or more elements may be extracted from the second database (e.g. the profile database). The one or more elements of the profile may be included or omitted from a generated profile depending on an existence of one or more privacy preferences, described below with reference to decision 424.

Decision 424 may involve determining whether one or more privacy preferences exist. Determining whether one or more privacy preferences exist may involve extracting privacy data from the privacy database. If the privacy data indicates a setting for omitting one or more privacy elements, then privacy preferences may exist. Privacy preferences for a profile of a target user may be set by, for example, an operator of a face recognition service, the target user, and/or another person.

In an embodiment, the privacy database may contain privacy preferences which allow (or prevent) sensor users to use the face recognition service. For example, the system may not allow usage of face recognition at specific locations or at specific times or at specific occasions. In another example, the system may not allow a particular sensor user to use the face recognition service to identify a specific target user or a group of target users (e.g. if the sensor user has violated terms of service in the past). Such privacy preferences may be selected by the operator of the face recognition service, the target user, and/or another person.

In an embodiment, the privacy database may contain privacy preferences which prevent specific elements of a profile (e.g. an image, name, gender, location, etc.) from being included in a customized profile. For example, the target user may select privacy preferences which prevent an image and a name associated with the profile of the target user from being included in a customized profile.

In an embodiment, the privacy preferences may instruct omission of one or more elements of the profile of the target user if a triggering event occurs. A triggering event may include, for example, a location of a sensor user, a location of the target user, a location the digital image is captured, a time the digital image is captured, a time the digital image is received, a face context from the face of the digital image, and an identity of a sensor user.

In one embodiment, the privacy preferences in the database may be implemented as database records that contain information pertaining to a context and a profile that should be used in that context. The context information may consist of (but is not limited to) location, time, objective, situation, face context, etc. The profile information may consist of multiple items each item type being (but is not limited to) text, video, image or audio. The items may belong to one or more contexts and a set of items synthesizes a profile that corresponds to a specific context.

Step 428 may involve generating a customized profile of the target user with the customized profile omitting one or more elements of the profile of the target user based on the one or more privacy preferences. In an embodiment, if a face recognition query in conflict with one or more privacy preferences is received, the face recognition query may be blocked, a customized profile may be generated, or a combination thereof. In an embodiment, if a triggering event occurs (e.g., a location of a sensor user, a location of the target user, a location the digital image is captured, a time the digital image is captured, a time the digital image is received, a face context from the face of the digital image, and an identity of a sensor user), the face recognition query may be blocked, a customized profile may be generated, or a combination thereof. For example, a target user may include a sensor user on a blocked list in the privacy preferences, triggering a customized profile to be generated for the sensor user. In another example, an operator of a face recognition service may add an adult entertainment location to a blocked list in the privacy preferences, triggering a customized profile to be generated for images captured in that location.

The customized profile may omit one or more elements of the profile associated with the target user. For example, the customized profile may omit all of the elements and include an error message (e.g., "Private Profile", "No match found", etc.). In another example, the customized profile may omit one or more elements and include one or more elements. For example, the customized profile may omit "Name: John Doe" and include "Gender: Male".

In an embodiment, the system may generate a summary of the outcome of the face recognition query. This summary may contain a success or failure of the query, the extracted profile F, the current context C and its closest context in the privacy database, and the identity of the sensor user. In an embodiment, the summary of the outcome of the face recognition query may be stored in the privacy database for later access by the target user.

Steps 432 and step 436 may involve transmitting the profile or the customized profile, respectively, of the target user to a sensor user. In step 432, the profile including the profile elements may be transmitted to the sensor user. The profile elements transmitted to the sensor user may include, for example, an image of the target user, a name of the target user, a gender of the target user, an age of the target user, and a location of the target user. In step 432, the customized profile omitting one or more elements of the profile may be transmitted to the sensor user. The customized profile transmitted to the sensor user may include, for example, a gender of the target user and may omit, for example, a name of the target user.

In an embodiment, the system may provide a notification to a target user if the profile or the customized profile is transmitted to a sensor user. For example, the system may provide the target user with a summary of the face recognition query. In an embodiment, the system may continuously track context changes of the target user (e.g. by matching the contexts with the existing contexts in the database) and, upon each change, notify the target user about the new profile that will be shared through the face recognition service. For example, if the target user enters a location on a blocked list, the system may notify the target user that one or more elements of the target user's profile may be omitted in a customized profile.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
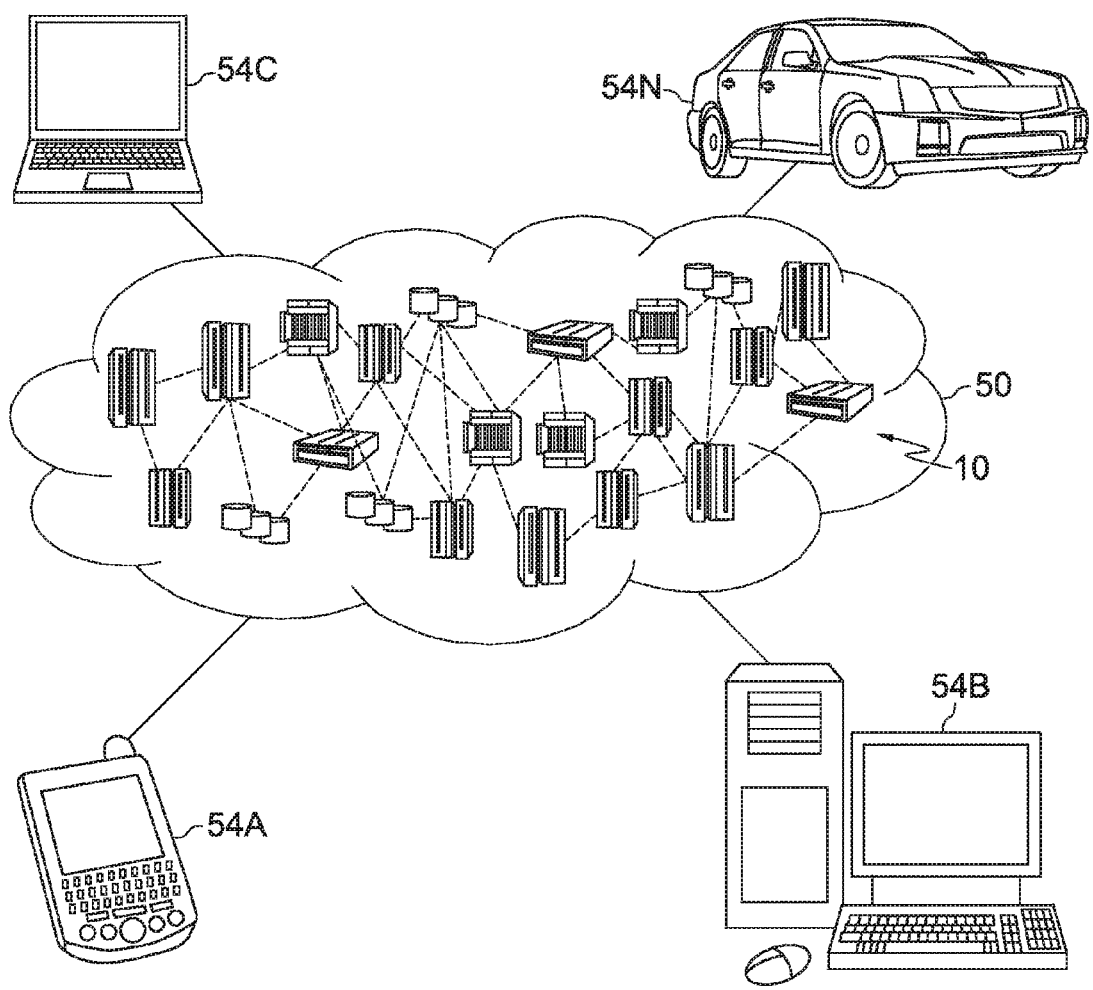
FIG. 6 depicts a cloud computing environment, in accordance with an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
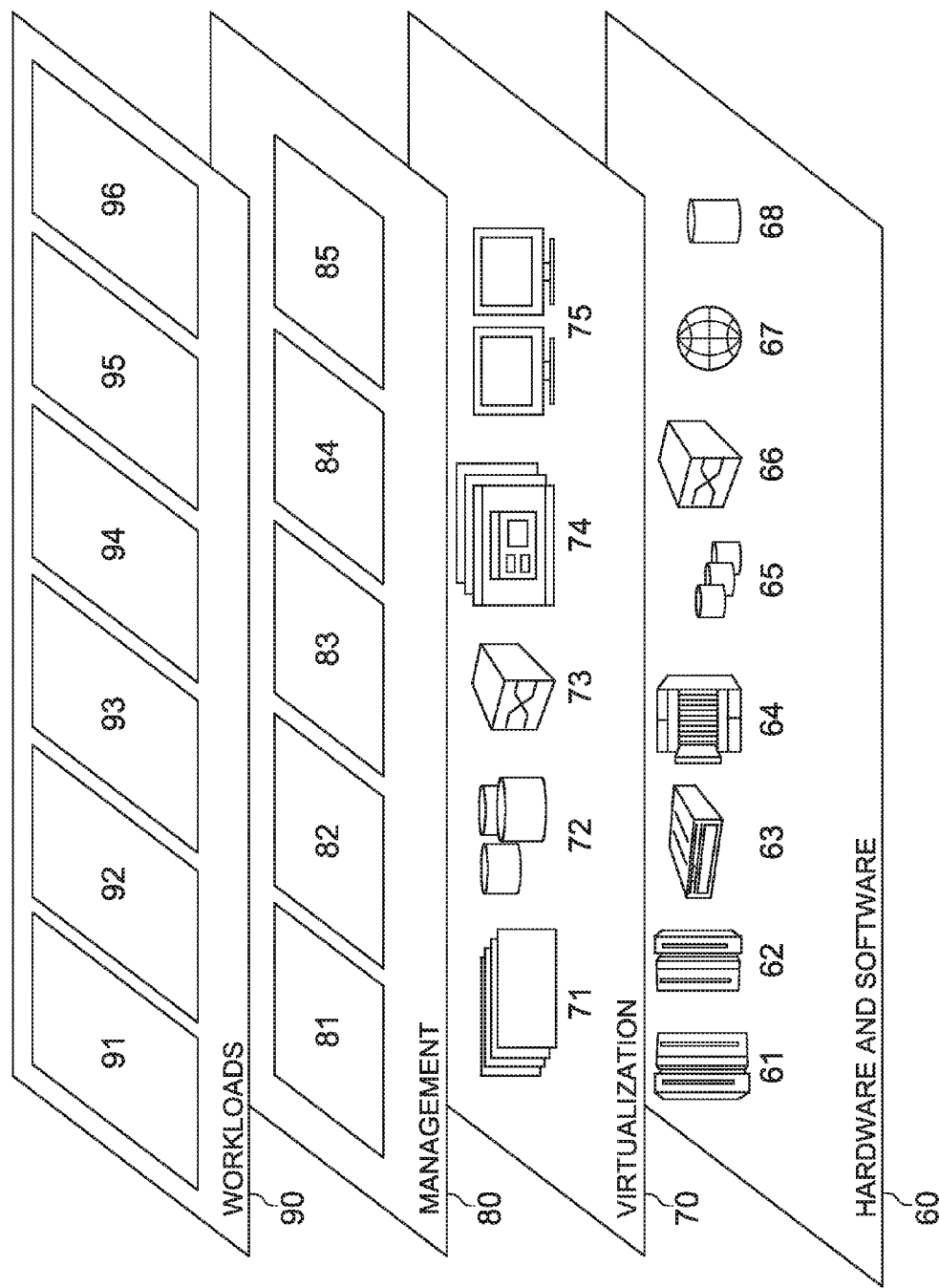
FIG. 7 depicts abstraction layers of the cloud computing environment, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling privacy in a mobile face recognition application 96.

In a related embodiment, cloud migration services may be performed as part of management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer program product for controlling privacy in a face recognition application, comprising a non-transitory tangible storage device having program code embodied therewith, the program code executable by a processor of a computer to perform a method, the method comprising:

capturing, by a sensor device, a digital image of a face;

receiving, by the sensor device, a face recognition query;

detecting, by the sensor device, a facial signature from the digital image of the face;

calculating, by the sensor device, a statistical correlation between the detected facial signature and one or more facial signatures in a first database;

identifying, by the sensor device, a target user associated with a facial signature among the one or more facial signatures in the first database based at least in part on the statistical correlation between the detected facial signature and the one or more facial signatures in the first database;

extracting, by the sensor device, a profile of the target user from a second database, wherein the profile comprises one or more privacy preferences;

generating, by the sensor device, a customized profile of the target user, wherein the customized profile omits one or more elements of the profile of the target user based on the one or more privacy preferences and further based on a facial expression of the target user, wherein a decision to omit the one or more elements from the customized profile is made based on detecting the facial expression of the target user in the digital image; and providing, by the sensor device, the customized profile of the target user.

* * * * *